United States Patent [19] [11] 3,953,083
Latvala et al. [45] Apr. 27, 1976

[54] DUTY CYCLE TRANSLATOR FOR ADAPTIVE BRAKING CONTROL CIRCUIT

[75] Inventors: Bruce E. Latvala; Marc A. Karon, both of Elyria, Ohio

[73] Assignee: The Bendix Corporation, South Bend, Ind.

[22] Filed: Dec. 9, 1974

[21] Appl. No.: 530,784

[52] U.S. Cl. .............................. 303/21 P; 303/20; 303/21 A
[51] Int. Cl.² ......................................... B60T 8/00
[58] Field of Search ................. 188/3 R, 181; 303/7, 303/20, 21; 340/53, 62

[56] References Cited
UNITED STATES PATENTS
3,507,542  4/1970  Cannella ................................. 303/7
3,671,081  6/1972  Jania et al ........................ 303/20 X Primary Examiner—Trygve M. Blix
Assistant Examiner—Stephen G. Kunin
Attorney, Agent, or Firm—Ken C. Decker; William N. Antonis

[57] ABSTRACT

An adaptive braking system for a vehicle having fluid-pressure operated brakes which includes a skid detecting circuit and a signal modifying circuit. The signal modifying circuit responds to the output of the skid detecting circuit to drive a duty cycle translator to generate a control signal which controls actuation of a modulating relay valve adapted to control fluid communication to the brake actuators. The duty cycle translator includes a pseudo-pressure-feedback control circuit which generates a signal approximating the response characteristics of the modulating relay valve and the brake actuators. The pseudo-pressure-feedback control enhances response of the system without requiring a pressure transducer to be used in the modulator or brake actuators to sense a feedback pressure.

16 Claims, 4 Drawing Figures

DUTY CYCLE TRANSLATOR FOR ADAPTIVE BRAKING CONTROL CIRCUIT

BACKGROUND OF THE INVENTION

This invention relates to an adaptive braking system for a vehicle having fluid-pressure actuated brakes.

Adaptive braking systems for vehicles having fluid-pressure actuated brakes, and in particular, systems designed for use with vehicles having brakes operated by air pressure, are limited in their performance by governmental regulations which require rapid brake actuation response during brake applications when intervention of the adaptive braking system is not required. To meet these fast response requirements, the various components of the air brake system, including the relay valves which are commonly also used as adaptive braking modulators, must have relatively large fluid pressure flow rates. However, these large flow rates are detrimental to good adaptive braking system performance, because the adaptive braking system cannot respond quickly enough to prevent wheel lock in this type of system without extending the stopping distance. In order to overcome this problem, some prior art systems have used so-called "pneumatic logic" within the modulating relay valve which is responsive to initiation of operation of the adaptive braking system to limit the presssure build rate through the modulating relay valve after the first adaptive braking cycle. Although this type of system has, in general, operated satisfactorily, the restricted flow rate limits the system response when higher pressure is required by the adaptive braking system and the increased complexity of the modulating relay valve decreases its reliability because small orifices are generally required, which are subject to interference by contaminants in the vehicle air supply. Other types of prior art systems have overcome this problem by employing a duty cycle translator which converts a brake pressure control signal into a prescribed duty cycle for a solenoid-actuated valve which is a part of the modulating relay valve which controls communication to the brake actuators during operation of the adaptive braking system. In this type of system, the solenoid is operated at a sufficiently high frequency that the relay valve will effectively integrate the duty cycle into a steady state pressure level. Although this system has also, in general, performed satisfactorily, systems of this type have a characteristically slow response which is detrimental to good adaptive braking system performance because they are open-loop systems. Theoretically, this defect may be cured by providing a pressure feedback signal by locating a pressure transducer in the modulating relay valve or brake pressure actuators and by comparing the signal generated by this transducer to the brake pressure control signal at the duty cycle translator. However, the requirement of a pressure transducer greatly increases the system cost and also increases installation problems, so this solution has not been deemed to be practical.

The present invention is related to an adaptive braking system having a duty cycle translator for controlling actuation of the modulating relay valve, and provides circuitry within the duty cycle translator which is responsive to the brake pressure control signal to generate a pseudo-pressure feedback signal which approximates the pressure level in the brake pressure actuators. This circuitry within the duty cycle translator approximates the time delays inherent in the electrically actuated portion of the modulating relay valve, and further approximates the response characteristics inherent within the modulator or relay valve and the brake actuators.

SUMMARY OF THE INVENTION

Therefore, an important object of our invention is to provide an adaptive braking system which requires a less complicated modulating relay valve than do existing adaptive braking systems using modulating relay valves employing pneumatic logic.

Another important object of our invention is to improve the response time of an adaptive braking system employing a duty cycle translator for control of the modulating relay valve.

Still another important object of our invention is to provide a duty cycle translator for an adaptive braking system which includes a circuit which generates a pseudo-pressure feedback signal which approximates the braking pressure level communicated to the vehicle brake actuators.

A still further important object of our invention is to provide a duty cycle translator for an adaptive braking system which has a circuit for generating a pseudo-pressure-feedback signal which approximates the time delays inherent in the operation of the electrically actuated valve which is a part of the modulating relay valve and which also approximates the response characteristics inherent for any change in pressure level to occur within the brake actuators after operation of the electrically actuated valve.

DETAILED DESCRIPTION

Figure 1:
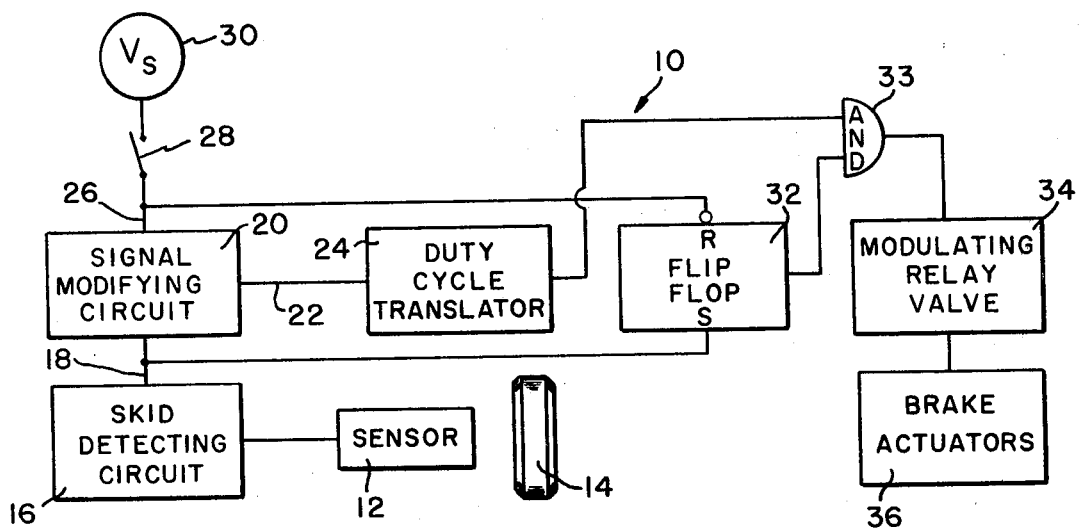
FIG. 1 is a diagrammatic illustration of an adaptive braking system made pursuant to the teachings of our present invention.

Referring now to the drawings, an adaptive braking system generally indicated by the numeral 10 includes a sensor 12 which is responsive to rotation of one of the vehicle wheels 14 to generate a speed signal which is proportional to the rotational velocity of the wheel 14. The output of the sensor 12 is transmitted to the input of a skid detecting circuit 16. Of course, more than one sensor 12 may be connected to appropriate selecting circuitry of a type well known to those skilled in the art. The skid detecting circuit may be of any type well known to those skilled in the art, and is responsive to the input signal from the sensor 12 to generate a signal on the output terminal 18 of the skid detecting circuit 16 when the circuit 16 detects an incipient skidding condition of the wheel 14, and terminates the signal on the terminal 18 when the incipient skidding condition of the wheel 14 terminates. Consequently, the signal on terminal 18 switches between two values; a high value when the skid detecting circuit 16 senses an incipient skidding condition of wheel 14 and a lower value at all other times. Such a circuit may be of the type disclosed in U.S. Pat. No. 3,804,470, owned by the assignee of the present invention and incorporated herein by reference. The signal on terminal 18 is fed into a signal modifying circuit 20 which generates a signal on the output terminal 22 thereof proportional to the desired pressure level in the vehicle brake actuators. Such a signal modifying circuit is disclosed in co-pending U.S. Patent application Ser. No. 530,785, filed Dec. 9, 1974, owned by the assignee of the present invention and incorporated herein by reference. A second input terminal 26 of the signal modifying circuit 20 is connected through a switch 28 to a voltage source 30 of predetermined value. The switch 28 is wired into the brake light switch of the vehicle, so that the switch 28 will be closed whenever the brakes of the vehicle are actuated and will be open whenever the brakes of the vehicle are released.

The duty cycle translator 24 generates a brake control signal which is fed through a flip flop 32 and an AND gate 33 to the electrically actuated valve which is a part of the system modulating relay valve 34. The relay valve 34 may be of the type disclosed in U.S. Pat. No. 3,838,892, owned by the assignee of the present invention and incorporated herein by reference. The modulating relay valve 34 controls fluid communication to the vehicle brake actuators 36, which of course, control actuation of the brakes controlling the wheel 14. The set input of the flip flop 32 is connected to the output terminal 18 of skid detecting circuit 16, and the reset terminal of the flip flop 32 is connected to the inverted signal on terminal 26 of signal modifying circuit 20. The output of flip flop 32 and the duty cycle translator 24 are connected to corresponding input terminals of an AND gate 33. The output of AND gate 33 controls the electrically actuated valve which is a part of modulating relay valve 34. Consequently, the flip flop 32 and AND gate 33 normally inhibit the signal from the duty cycle translator 24. However, when the skid detecting circuit 16 senses an initial incipient skidding condition, flip flop 32 is set, thereby enabling the duty cycle translator 24 to control actuation of the modulating relay valve 34. The flip flop 32 remains set until the brakes of the vehicle all are released, thereby terminating the signal on terminal 26 and therefore resetting the flip flop 32.

Figure 3:
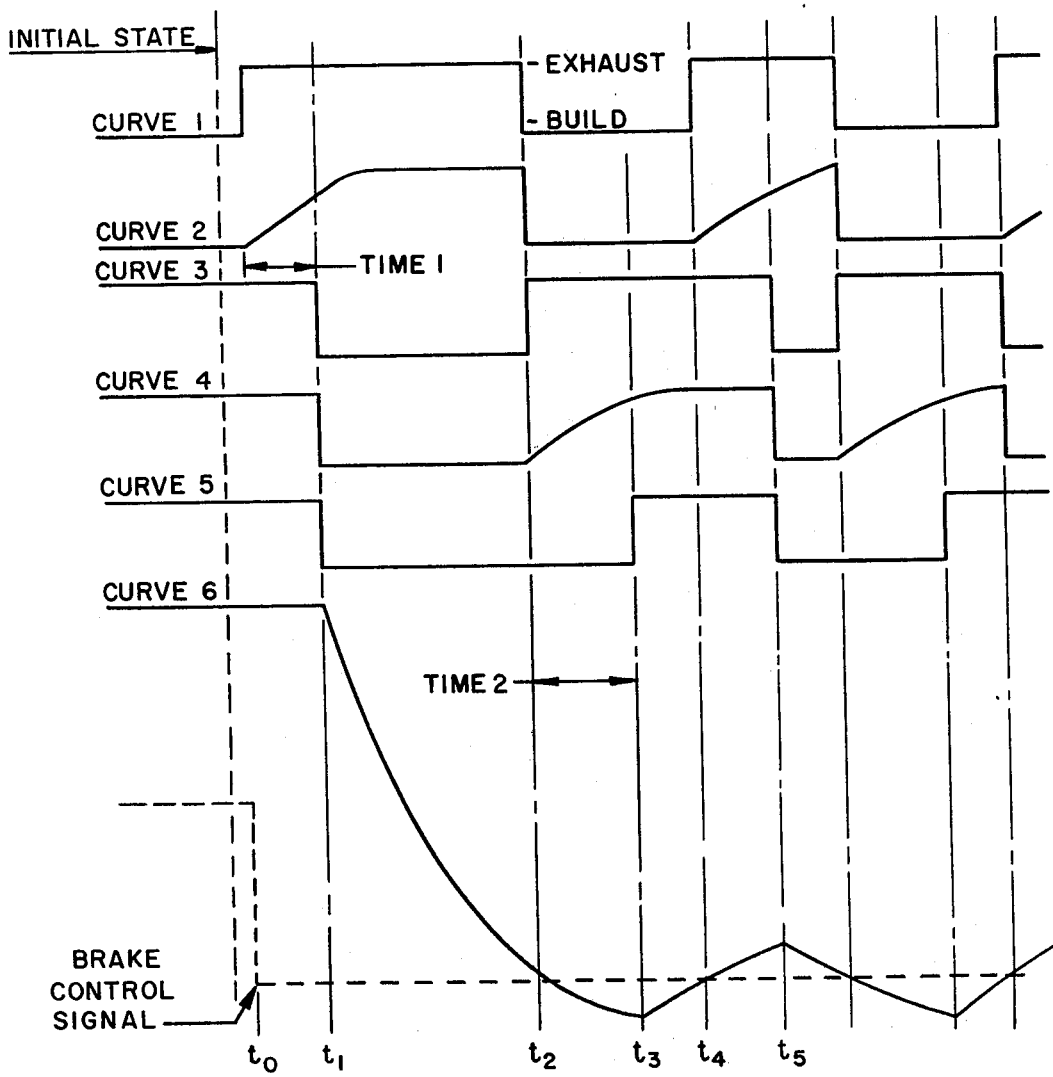
FIG. 3 is a graphical representation of the value of the various signals generated within the duty cycle translator illustrated in FIG. 2 at various times during the operation of the adaptive braking system.
Figure 2:
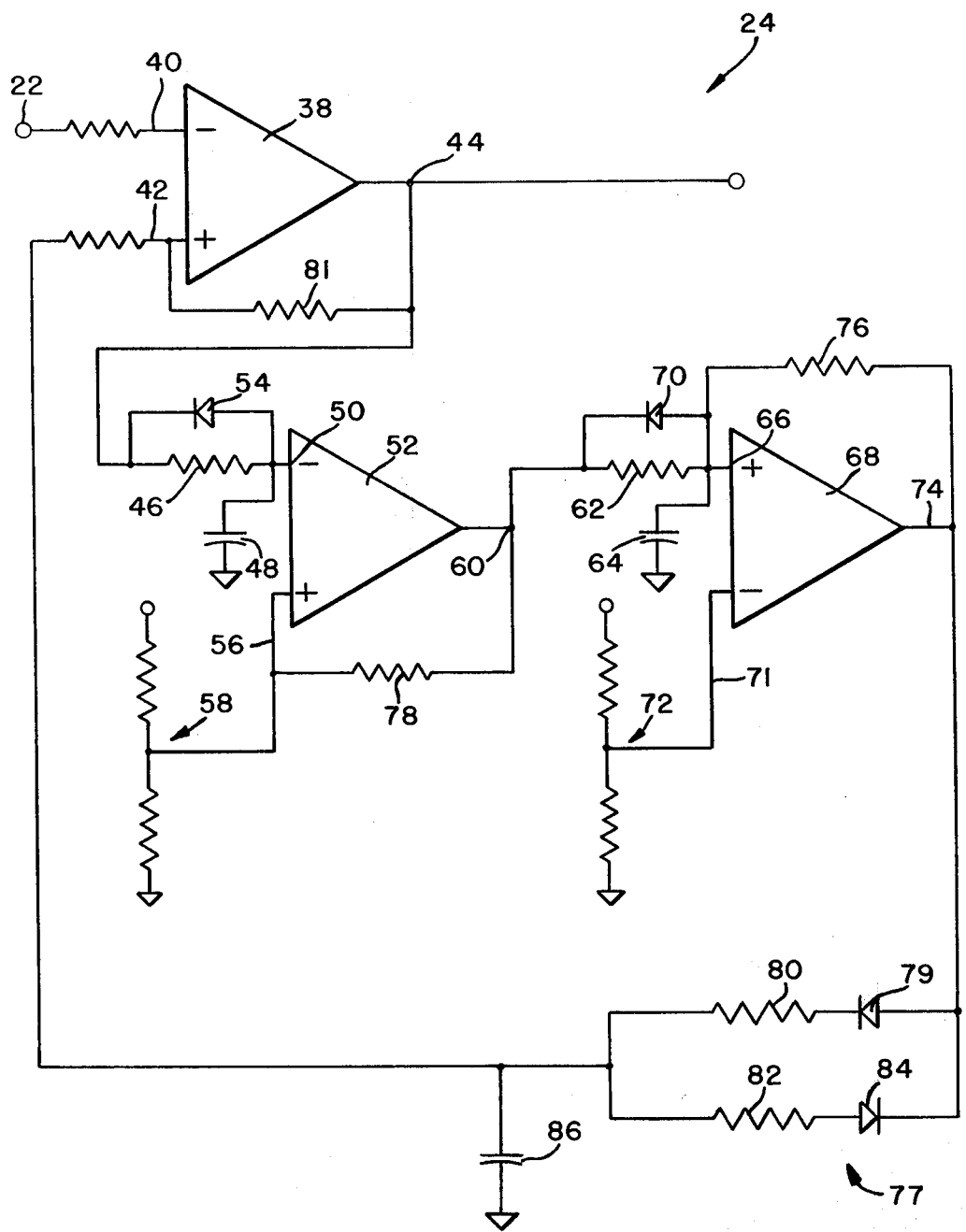
FIG. 2 is a detailed schematic illustration of the duty cycle translator used in the adaptive braking system illustrated in FIG. 1.
Figure 4:
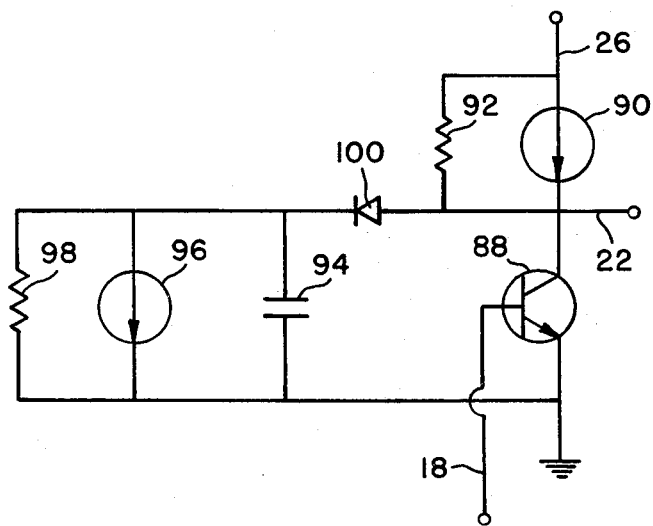
FIG. 4 is a detailed schematic illustration of the signal modifying circuit used in my invention.

Referring now to FIGS. 2 and 3, the construction and operation of the duty cycle translator 24 will now be described in detail. Duty cycle translator 24 includes an operational amplifier 38 of a type well known to those skilled in the art which compares the signals on the positive and negative input terminals thereof and which generates a signal whenever the value of the signal on the positive terminal exceeds the value of the signal on the negative terminal. In this case, the negative terminal 40 of the amplifier 38 is connected to the output terminal 22 of the signal modifying circuit 20 and the positive terminal 42 is connected to the pseudo-pressure-feedback signal, which is generated in a manner to be described hereinafter. The signal on the output terminal 44, which is represented by the graph labelled curve 1 in FIG. 3, is fed to the electrically actuated valve which is a part of modulating relay valve 34. When the value of the signal at the output 44 of the amplfier 38 is high, the electrically actuated valve is actuated to thereby decay braking pressure, and when the signal at terminal 44 is low, the electrically actuated valve is closed to permit braking pressure to rebuild.

The signal at terminal 44 is also fed through a resistor 46 to charge a capacitor 48 which is connected to the negative terminal 50 of another operational amplifier 52 which is similar to the operational amplifier 38. A diode 54 is connected around the resistor 46, and the value of the signal at the terminal 50 of amplifier 52 is represented by the graph labelled curve 2 in FIG. 3. The positive input terminal 56 of amplifier 52 is connected to a voltage divider network generally indicated by the numeral 58 which generates a signal transmitted to terminal 56 which represents about 66% of the maximum permissible value of the signal transmitted to terminal 50. The amplifier 52, as does the amplifier 38, compares the signals on terminals 56 and 60 and generates a signal on output terminal 60 thereof when the value of the signal on terminal 56 exceeds the value of the signal on terminal 50. The value of the signal on the output terminal 60 is illustrated graphically in FIG. 3 by the graph labelled curve 3. The signal on output terminal 60 is fed through a resistor 62 to charge capacitor 64 which is connected to the positive terminal 66 of an operational amplifier 68 which is similar to operational amplifiers 52 and 38. A diode 70 is connected around the resistor 62. The value of the signal at terminal 66 is represented graphically by the graph labelled curve 4 in FIG. 3. The negative input terminal 71 of the operational amplifier 68 is connected to a voltage dividing network generally indicated by the numeral 72 which is similar to the voltage dividing network 58 and which generates a signal transmitted to terminal 71 which represents about 66% of the maximum permissible value of the signal on terminal 66. Like the operational amplifiers 38 and 52, the operational amplifier 68 compares the signals on the terminals 66 and 71 and generates a signal on output 74 whenever the value of the signal on the positive input terminal exceeds the value of the signal on the negative input signal. The signal on the terminal 74 is represented graphically by the graph labelled curve 5 in FIG. 3. Of course, necessary feedback resistors 76, 78 and 79 must be connected around the operational amplifiers 68, 52, and 38 in a manner well known to those skilled in the art.

The signal on terminal 74 is transmitted to a circuit generally indicated by the numeral 77 which consists of a diode 79 and resistor 80 connected in parallel with another resistor 82 and a diode 84, which is connected in opposite polarity of the diode 79. The output of the circuit 77 is used to control the charge on a capacitor 86 which will be charged and discharged at a rate governed by the value of the capacitor 86 and one of the resistors 80 or 82 as the case may be. The valve of the charge on the capacitor 86 is represented graphically by the graph labelled curve 6 in FIG. 3, and is the pseudo-pressure-feedback signal which approximates the brake pressure level in the actuators 36. This signal is connected to the input terminal 42 of the operational amplifier 38.

Referring now to the signal modifying circuit 20, the output terminal 18 of skid detecting circuit 16 is connected to the base electrode of a transistor 88, the collector and emitter electrodes of which are connected to the output terminal 22 and ground, respectively. A current source 90 is connected between the terminal 26 and the terminal 22. A resistor 92 is connected in parallel with the current source 90. A capacitor 94 is connected in parallel with the transistor 88, and a current sink 96 and resistor 98 are connected in parallel with capacitor 94. The capacitor 94 is prevented from discharging through the terminal 28 by a diode 100, which, of course, permits charging of the capacitor through current source 90. The design of the current source 90 and current sink 96 are well known to those skilled in the art, and may for example, be of the type disclosed in detail in the aforementioned U.S. Pat. No. 3,804,470, owned by the assignee of the present invention and incorporated herein by reference.

MODE OF OPERATION

Assume that in the initial condition of the duty cycle generator 24, before initiation of adaptive control of the vehicle's brakes, that the relative values of the signals on terminals 40 and 42 of the comparator 38 are such that the value of signal on 44 is low, thereby causing the modulating relay valve 34 to permit uninhibited fluid communication to the brake actuators 36. It is further assumed that the system has remained in this condition prior to the initiation of adaptive braking control of the vehicle's brakes for a time period longer than the time constants of the various components on the circuitry of the duty cycle translator 24. In this condition, capacitor 48 is discharged through the diode 54 so that the signal on input terminal 50 of comparator 52 is relatively low. Consequently, the signal on terminal 60 will be high, as illustrated in curve 3 in FIG. 3. The high value of the signal on the terminal 60 maintains the capacitor 64 charged, and consequently, the signal on terminal 66 of comparator 68 is greater than the value of the signal on terminal 71 of comparator 68. Therefore, the signal on output terminal 74, which is illustrated as curve 5 of FIG. 3, will also be at a relatively high value. Consequently, the diode 79 will be forward biased, so that the capacitor 86 will be fully charged. Consequently, at the initiation of adaptive control of the vehicle brakes at time $t_0$ illustrated in FIG. 3, the value of the signal on terminal 42 will be at its maximum permissible value.

Assume that at time $t_0$ in FIG. 3 that the skid detecting circuit 16 senses an incipient skidding condition of the vehicle wheel 14 and thereby causes the brake control signal at the output terminal 22 of signal modifying circuit 20 to drop to its lowest possible value. When this occurs at time to, comparator 38 switches, thereby causing the value of the signal on terminal 44 to switch to the high state. This signal actuates the modulating relay valve 34 to initiate a brake pressure reduction in the brake actuators 36. The high value of the signal on terminal 44 charges capacitor 48 with a time constant which depends upon relative values of the resistor 46 and the capacitor 48. When the value of the signal across the capacitor 48 represented on terminal 50 of amplifier 52 exceeds the value of the signal transmitted to the terminal 56 of this amplifier, which represents, as pointed out hereinabove, about 66% of the maximum value of the signal on terminal 50, amplifier 52 switches, causing the signal on output terminal 60 thereof, which is represented by curve 3 in FIG. 3 to switch from the high to the low state. The time at which the capacitor 48 achieves approximately 66% of its maximum value is represented by time $t_1$ in FIG. 3. As pointed out hereinabove, at time $t_1$ the value of the signal on terminal 60 switches from the high to the low state, which causes the charge on the capacitor 64 to decay rapidly through diode 70, thereby almost immediately reducing the value of the signal on terminal 66 of operational amplifier 68 to a value less than the signal on the terminal 71. When this occurs, the value of the signal in the output terminal 74 of operational amplifier 68 switches from the high state to the low state, as illustrated by curve 5 in FIG. 3. The low value of the signal on terminal 74 back biases the diode 79 and forward biases diode 84, so that capacitor 86 discharges through resistor 82 and diode 84 with a time constant dependent upon the relative values of the resistor 82 and the capacitor 86. The value of the charge across the capacitor 86, which is the pseudo-pressure-feedback signal connected to the terminal 42 of operational amplifier 38, decays in an exponential manner in the time period $t_1 - t_3$, as illustrated by curve 6 in FIG. 3. It will be noted that, although the exhaust cycle was initiated at time $t_0$, the value of the feedback signal does not recognize any decrease in braking pressure until time $t_1$. Consequently, the time interval $t_0 - t_1$ represents the time delay required to actuate the electrically operated valve which controls the modulating relay valve 34. Similarly, it will be noticed that curve 6 in FIG. 3 continues to decrease even when the value of this signal drops below the value of the brake control signal at time $t_2$ in FIG. 3, and continues to decrease until time $t_3$. Consequently, the time interval $t_2 - t_3$ represents the time delay required to turn off the aforementioned solenoid in the modulating relay valve 34. However, when the value of the pseudo-pressure-feedback signal drops below the command value of the brake control signal at time $t_2$ in FIG. 3, the operational amplifier 38 again switches states, so that the value of the signal on the terminal 44 again goes low to turn off the electrically actuated valve to initiate a brake pressure increase in the brake actuators 36. When this occurs, the charge on capacitor 48 bleeds off rapidly through the diode 54, thereby causing operational amplifier 52 to immediately switch states to again bring the value of the signal on terminal 60, as represented by curve 3 in FIG. 3, to the high state. When this occurs, capacitor 64 will be charged with a time constant dependent upon the relative values of the capacitor 64 and the resistor 62. When the charge on the capacitor 64, which is transmitted to input terminal 66 of operational amplifier 68, exceeds 66% of its maximum permissible charge, the signal on terminal 74, which is represented by curve 5 in FIG. 3, switches to the high state. This occurs at time $t_3$ in FIG. 3. When the value of the signal on terminal 74 goes high, diode 79 will be forward biased and diode 84 will be back biased, so that the capacitor 86 will be charged with a time constant dependent upon the relative values of the resistor 80 and the capacitor 86. Since the charge on the capacitor 86, which is the pseudo-pressure-feedback signal is now increasing, the charge decrease across capacitor 86 terminates at time $t_3$ and increases at an exponential rate dependent upon the relative values of resistor 80 and capacitor 86 in the time interval $t_3 - t_5$. It will, of course, be noted that the charge increases across the capacitor 86 continues even though the value of the charge on the capacitor 86, and therefore the value of the pseudo-pressure feedback signal, increases above the value of the brake control signal on terminal 40 at time $t_4$. The time $t_4 - t_5$ represents the solenoid turn-on time for another brake pressure decay cycle. As illustrated in curve 1 of FIG. 3, at time $t_4$ the operational amplifier 38 again switches states to initiate another brake pressure decay cycle, in precisely the same manner as discussed hereinabove when the duty cycle translator is initially actuated at time $t_0$. The duty cycle translator 24 continues to operate to this manner, oscillating about the brake control signal, for an indefinite time period.

At some subsequent time, the skid detecting circuit 16 will sense that an incipient skidding condition of the wheel 14 no longer exists. Therefore, the value of the brake control signal transmitted to terminal 40 of operational amplifier 38 will increase. If a step increase is specified, a step increase in the value of the brake control signal transmitted to terminal 40 of the duty cycle translator 24 will occur. In this case, the duty cycle translator 24 will continue to operate precisely as described above to increase pressure by deactuating the electrically actuated valve to permit an exponential increase in braking pressure, similar to the exponential decrease in the time interval $t_1 - t_2$ illustrated by curve 6 in FIG. 3. Also, the duty cycle translator 24 will respond to changes in the brake control signal transmitted to terminal 40 which are other than step increases or decreases by adjusting the relative times that the values of the signal on terminal 44 are high or low. In conclusion, it will be noticed by those skilled in the art that the duty cycle translator 24 responds to a step decrease in the brake control signal transmitted to terminal 40 by causing the modulating relay valve 34 to exhaust pressure until the desired pressure level is approximately attained and then by causing the value of the signal on terminal 44 to oscillate on and off to maintain the desired pressure level. Similarly, the duty cycle translator responds to a step increase in the brake control signal transmitted to terminal 40 by turning off the electrically actuated valve within the modulating relay valve 34 until the desired pressure level is substantially attained, and then by oscillating the value of the signal on terminal 44 to maintain this pressure level. Similarly, the translator 24 will respond to a ramp increase or decrease in the value of the brake control signal by remaining off in the case of a pressure increase for a proportionally longer time during each cycle than it remains on so that the average fluid pressure level increases in a ramp-like manner. The device, of course, operates in the reverse manner for a ramp decrease in the value of the signal transmitted to the terminal 40. The duty cycle translator 24 will inherently respond in a similar manner for any other changes in the value of the signal transmitted to the terminal 40.

We claim:

1. In a vehicle having a wheel, a brake controlling said wheel, and fluid pressure reponsive means for actuating said brake, and adaptive braking system controlling communication to said fluid pressure responsive means comprising:
    speed sensing means for generating a speed signal proportional to the rotational velocity of said vehicle wheel;
    skid detecting means responsive to said speed signal for generating a skid detecting signal when an incipient skidding condition of said wheel is detected and terminating said skid detecting signal when the incipient skidding condition terminates;
    means responsive to the output of said skid detecting means for generating a brake pressure control signal; and
    modulator means responsive to said brake pressure control signal for controlling communication to said fluid pressure responsive means;
    said brake pressure control signal generating means including means responsive to said skid detecting signal for generating a pressure command signal, means for generating a feedback signal without direct measurement of the fluid pressure level in said fluid pressure actuator, and means for comparing the feedback signal with the pressure command signal and generating said control signal when the feedback signal and the pressure command signal are in a predetermined relationship with one another, said feedback signal generating means being responsive to said control signal to generate said feedback signal.

2. The invention of claim 1:
wherein said feedback signal generating means includes circuit means defining an electronic analogue of said pressure responsive means, whereby said feedback signal is substantially proportional to the fluid pressure level in said fluid pressure responsive means.

3. The invention of claim 1:
wherein said feedback signal generates means generates said feedback signal to approximate the fluid pressure level in said fluid pressure responsive means.

4. The invention of claim 1:
wherein said fluid pressure responsive means includes electrically actuated valve means controlling communication into said fluid pressure responsive means, said feedback signal generating means including circuit means generating electrical analogues of the time delays required to actuate and release said electrically actuated valve means.

5. The invention of claim 1:
wherein said feedback signal generating means includes means generating an electrical disturbance a predetermined time after generation of said control signal and terminating said electrical disturbance a predetermined time after said control signal terminates.

6. The invention of claim 5:
wherein said means generating said electrical disturbance includes means generating a first exponential signal when said control signal is generated, means comparing said first exponential signal with a first predetermined reference signal and generating said disturbance when the first exponential signal and said first predetermined reference signal are in a predetermined relationship with one another, means generating a second exponential signal when said control signal is terminated and means comparing said second exponential signal with a second predetermined reference signal and terminating said disturbance when the second exponential signal and said second predetermined reference signal are in a predetermined relationship with one another.

7. The invention of claim 5:
wherein said feedback signal generating means includes means responsive to said disturbance to generate a decreasing signal and to termination of said disturbance to generate an increasing signal, said increasing and decreasing signals defining said control signal.

8. The invention of claim 7:
wherein said increasing and decreasing signals are exponential signals.

9. The invention of claim 1:
wherein said feedback signal generating means includes first means responsive to generation of said control signal for generating a first time delay, second means responsive to termination of said control signal for generating a second time delay, means responsive to expiration of said first time delay for generating a decreasing signal, and means responsive to expiration of said second time delay for terminating said decreasing signal and generating an increasing signal, said increasing and decreasing signals defining said feedback signal.

10. The invention of claim 9:
wherein said increasing and decreasing signals are exponential signals.

11. The invention of claim 1:
wherein said fluid pressure responsive means includes fluid pressure controlling valve members controlling fluid communication in the said fluid pressure responsive means, said feedback signal generating means including circuit means generating electrical analogues of pressure build and decay rates resulting from the opening and closing of said fluid pressure controlling valve members.

12. The invention of claim 11:
wherein said fluid pressure responsive means further includes electrically operated means controlling said fluid pressure controlling valve member, said feedback signal generating means including other circuit means generating electrical analogues of the time delays required to actuate and release said electrically operated means.

13. In a control device for regulating the fluid pressure in a fluid pressure responsive device:
means for generating a command pressure signal representing the desired pressure level in said deivce;
means for generating a feedback signal without direct measurement of the fluid pressure level in said fluid pressure responsive device; and
means for comparing the feedback signal with the command pressure signal and generating an output signal when the feedback signal and the pressure command signal are in a predetermined relationship with one another;
said feedback signal generating means being responsive to said output signal to generate said feedback signal as a function of the output signal;
said feedback signal generating means including means generating an electrical disturbance a predetermined time after generation of said output signal and terminating said electrical disturbance a predetermined time after said output signal terminates.

14. The invention of claim 13:
wherein said means generates said electrical disturbance including means generating a first exponential signal when said output signal is generated, means comparing said first exponential signal with a first predetermined reference signal and generating said disturbance when the first exponential signal and said first predetermined reference signal are in a predetermined relationship with one another, means generating a second exponential signal when said output signal is terminated and means comparing said second exponential signal with a second predetermined reference signal and terminating said disturbance when the second exponential signal and said second predetermined reference signal are in a predetermined relationship with one another.

15. the invention of claim 13:
wherein said feedback signal generating means includes means responsive to said disturbance to generate a decreasing signal and to termination of said disturbance to generate an increasing signal, said increasing and decreasing signals defining said output signal.

16. In a control device for regulating the fluid pressure in a fluid pressure responsive device:
means for generating a command pressure signal representing the desired pressure level in said device;
means for generating a feedback signal without direct measurement of the fluid pressure level in said fluid pressure responsive device; and
means for comparing the feedback signal with the command pressure signal and generating an output signal when the feedback signal and the pressure command signal are in a predetermined relationship with one another;
said feedback signal generating means being responsive to said output signal to generate said feedback signal as a function of the output signal;
said feedback signal generating means including first means responsive to generation of said output signal for generating a first time delay, second means responsive to termination of said output signal for generating a second time delay, means responsive to expiration of said first time delay for generating a decreasing signal, and means responsive to expiration of said second time delay for terminating said decreasing signal and generating an increasing signal, said increasing and decreasing signals defining said feedback signal.

* * * * *